(12) United States Patent
Svensson et al.

(10) Patent No.: US 11,190,009 B2
(45) Date of Patent: Nov. 30, 2021

(54) PROTECTION OF AN INDUCTIVE ELEMENT

(71) Applicant: ABB Schweiz AG, Baden (CH)

(72) Inventors: Jan Svensson, Västerås (SE); Kalle Ilves, Västerås (SE); Minos Beniakar, Västerås (SE); Theodore Soong, Toronto (CA)

(73) Assignee: ABB Schweiz AG, Baden (CH)

( * ) Notice: Subject to any disclaimer, the term of this patent is extended or adjusted under 35 U.S.C. 154(b) by 278 days.

(21) Appl. No.: 16/471,645

(22) PCT Filed: Nov. 8, 2017

(86) PCT No.: PCT/EP2017/078596
§ 371 (c)(1),
(2) Date: Jun. 20, 2019

(87) PCT Pub. No.: WO2018/114120
PCT Pub. Date: Jun. 28, 2018

(65) Prior Publication Data
US 2020/0091708 A1    Mar. 19, 2020

(30) Foreign Application Priority Data
Dec. 22, 2016   (EP) .................................... 16206114

(51) Int. Cl.
*H02H 9/00* (2006.01)
*H02H 7/12* (2006.01)
*H02H 9/04* (2006.01)

(52) U.S. Cl.
CPC .......... *H02H 9/005* (2013.01); *H02H 7/1216* (2013.01); *H02H 9/042* (2013.01)

(58) Field of Classification Search
CPC .......... H02H 7/12; H02H 7/24; H02H 7/1216; H02H 9/005; H02H 9/04; H02H 9/06; H02H 9/049; H02H 9/042
See application file for complete search history.

(56) References Cited

U.S. PATENT DOCUMENTS

| | | | |
|---|---|---|---|
| 2005/0068709 A1* | 3/2005 | Kouwenhoven | H02H 9/06 361/118 |
| 2009/0154034 A1 | 6/2009 | Tallam | |

(Continued)

FOREIGN PATENT DOCUMENTS

| | | |
|---|---|---|
| CN | 1445898 A | 10/2003 |
| CN | 201854028 U | 6/2011 |

(Continued)

OTHER PUBLICATIONS

Japanese Office Action and Translation Application No. 2019-532716 Completed: Dec. 3, 2019 6 pages.

(Continued)

*Primary Examiner* — Nguyen Tran
(74) *Attorney, Agent, or Firm* — Whitmyer IP Group LLC

(57) ABSTRACT

A protection arrangement for a multiphase uninterruptible power supply system including a vacuum circuit breaker connected in series with an inductive element, where the inductive element includes, for every phase, two series-connected magnetically coupled windings separated by a tap point. The protection arrangement includes one first group of protective components per phase, each first group including a first protective component having a first end connected to a link between the vacuum circuit breaker and the inductive element and a second end connected to a corresponding tap point, where at least one protective component in each first group is a surge arrester.

19 Claims, 4 Drawing Sheets

(56) References Cited

U.S. PATENT DOCUMENTS

| | | | |
|---|---|---|---|
| 2013/0222958 A1 | 8/2013 | Fu et al. | |
| 2013/0321959 A1* | 12/2013 | Ranstad | H02H 7/1216 361/18 |
| 2014/0340807 A1 | 11/2014 | Kularatna | |
| 2016/0087431 A1 | 3/2016 | Krumpholz | |
| 2016/0149396 A1* | 5/2016 | Lindell | H02H 9/04 361/35 |

FOREIGN PATENT DOCUMENTS

| | | |
|---|---|---|
| CN | 202111493 U | 1/2012 |
| CN | 202142848 U | 2/2012 |
| CN | 205811534 U | 12/2016 |
| CN | 107210122 A | 9/2017 |
| EP | 3023998 A1 | 5/2016 |
| JP | H10191555 A | 7/1998 |
| JP | 2002510187 A | 4/2002 |
| JP | 2003516103 A | 5/2003 |
| WO | 2015007621 A1 | 1/2015 |

OTHER PUBLICATIONS

Chinese Office Action and Search Report Application No. 2017800799798 Completed: Oct. 10, 2019 4 Pages.
Korean Office Action Translation Application No. 10-2019-7019731 dated Oct. 15, 2019 4 pages.
European Search Report Application No. EP 16 20 6114 Completed: May 31, 2017; dated Jun. 14, 2017 12 pages.
International Search Report and Written Opinion of the International Searching Authority Application No. PCT/EP2017/078596 Completed: Dec. 18, 2017; dated Jan. 8, 2018 12 pages.
NEPSI Northeast Power Systems, Inc. "MV-TVSS Medium Voltage Transient Surge Suppressor", Bulletin:800-00, Rev. Oct. 8, 2015 4 pages.

* cited by examiner

PROTECTION OF AN INDUCTIVE ELEMENT

TECHNICAL FIELD

The present invention generally relates to uninterruptable power supply systems. More particularly the present invention relates to a protection arrangement for a multiphase uninterruptible power supply system and a multiphase uninterruptible power supply system comprising such a protection arrangement.

BACKGROUND

Uninterruptable power supply (UPS) systems may be used for supplying power to loads such as data centers. Such a system may be a multiphase system comprising a number of UPS modules between a cable connected to a grid and one or more loads, where an UPS module may comprise an inductive element comprising two series-connected magnetically coupled windings per phase separated by tap points and an auxiliary power supply in the form of a converter connected to the tap points. The inductive element can be provided in the form of an auto transformer in which all windings in all 3 phases are magnetically coupled to each other.

Faults occur on the grid side resulting in voltage dips, phase jumps and voltage swells or faults occur in the cable connected to the grid. To separate the load from these faults, a circuit breaker may be connected between the cable and the UPS module.

However, if the circuit breaker is a vacuum circuit breaker, then the opening of it may lead to high transient voltages at the UPS module and this may therefore need to be protected.

A commonly used type of protective component is a surge arrester. Surge arresters are for instance known to be used for protecting transformers, such as dry type transformers, see for instance EP3023998 and US 2016/0149396.

However, they have also been known to be used in other environments. US 2013/0321959 does for instance disclose a power supply converter unit where surge arresters are connected between phases as well as between phase and ground before and after an inductor for protecting it.

It would therefore be of interest to protect parts of such a UPS module, such as the first windings of the inductive element.

SUMMARY

The present invention is directed towards protecting an inductive element of a multiphase uninterruptible power supply system.

This object is according to a first aspect of the present invention achieved through a protection arrangement for a multiphase uninterruptible power supply system comprising a vacuum circuit breaker connected in series with an inductive element, where the inductive element comprises, for every phase, two series-connected magnetically coupled windings separated by a tap point.

The protection arrangement comprises one first group of protective components per phase, each first group comprising:

a first protective component having a first end connected to a link between the vacuum circuit breaker and the inductive element and a second end connected to a corresponding tap point, where at least one protective component in each first group is a surge arrester.

The object is according to a second aspect of the invention achieved through an uninterruptible power supply system comprising a vacuum circuit breaker connected in series with an inductive element as well as a protection arrangement according to the first aspect.

The above described inductive element may also be an autotransformer in which all windings are magnetically coupled with each other.

The present invention has a number of advantages. It protects the inductive device against over-voltages and especially over-voltages occurring across the first windings due to the operation of the first circuit breaker.

BRIEF DESCRIPTION OF THE DRAWINGS

The present invention will in the following be described with reference being made to the accompanying drawings, where FIG. 1 schematically shows a power supply system comprising a number of branches where one comprises a first circuit breaker in series with an inductive element comprising two series-connected magnetically coupled windings per phase, FIG. 2 schematically shows a first embodiment of a protective circuit together with the first circuit breaker and inductive element, FIG. 3 schematically shows a second embodiment of the protective circuit together with the first circuit breaker and inductive element, FIG. 4 schematically show a third embodiment of the protective circuit together with the first circuit breaker and inductive element, FIG. 5 schematically shows a fourth embodiment of the protective circuit together with the first circuit breaker and a first half of the inductive element, FIG. 6 schematically shows a fifth embodiment of the protective circuit together with the first circuit breaker and the first half of the inductive element, and FIG. 7 schematically shows another variation of the protective circuit together with the first circuit breaker and the inductive element.

DETAILED DESCRIPTION

In the following, a detailed description of preferred embodiments of the invention will be given.

Figure 1:
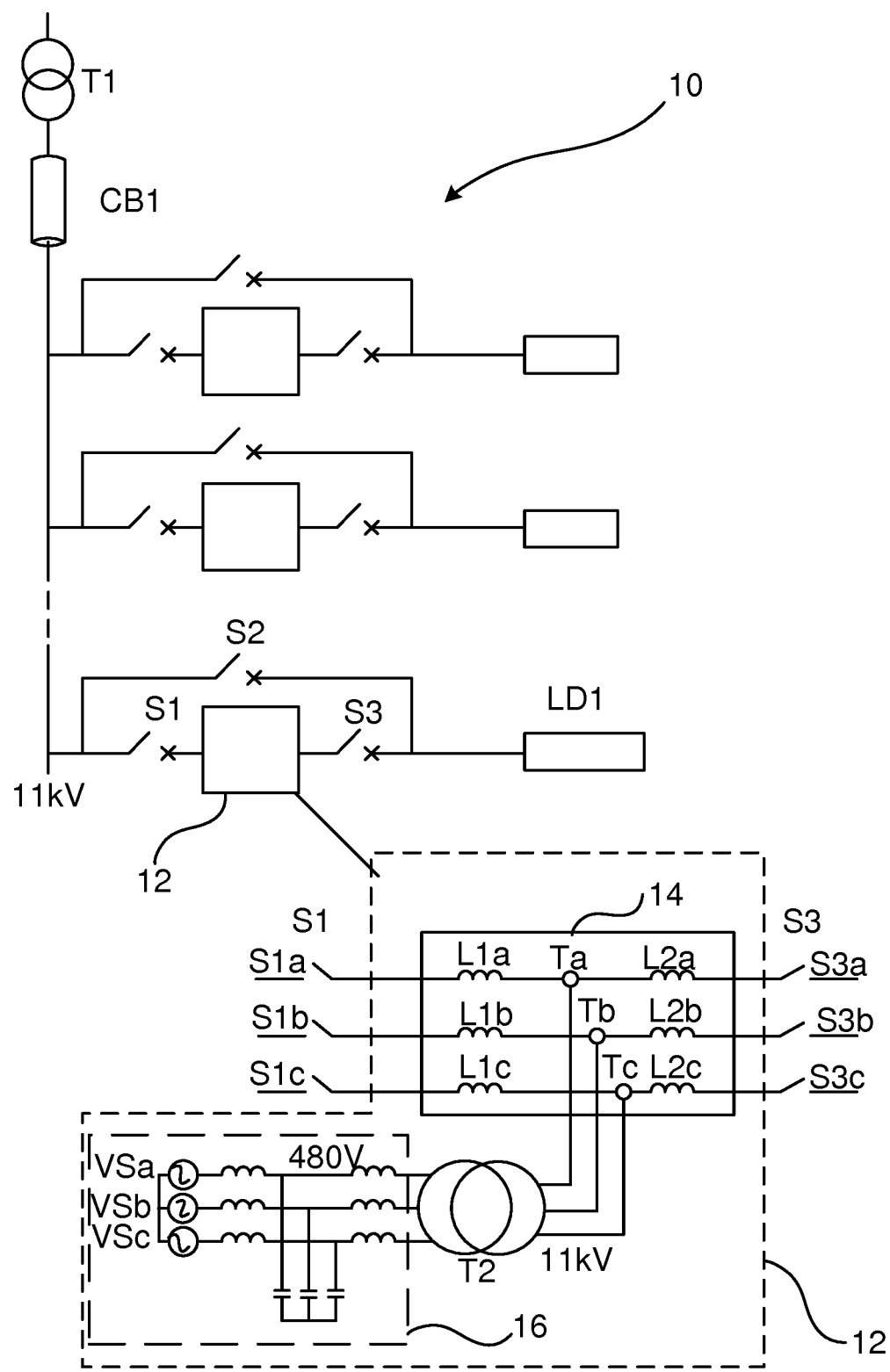

FIG. 1 schematically shows a power supply system 10 in order to provide power to a load, which load may as an example be a data center comprising a number of servers and a cooling system for such a data center. The power supply system 10 is with advantage a medium voltage (MV) multiphase power supply system and receives power for instance from a power distribution system or grid (not shown) via a first transformer T1. The first transformer T1 is in turn connected to a first cable CB1, which may also be termed an upstream cable, since loads are placed downstream from this cable CB1. A number of loads may be connected to this cable. The cable may as an example provide a medium voltage such as 11 kV.

Moreover, the power supply system 10 may be an uninterruptible power supply (UPS) system. For this reason there may be provided a number of UPS branches connected in parallel between the cable and corresponding loads. In FIG. 1, a number of such branches with loads are indicated. Here a lowermost branch connected to a load LD1 and comprising an UPS module 12 is emphasized, since they all are realized in the same way.

As can be seen in FIG. 1 there are also three circuit breakers S1, S2 and S3 in the lowermost branch, where a first circuit breaker S1 and a third circuit breaker S3 are connected in series with and on opposite sides of the UPS module 12, and a second circuit breaker S2 is connected in parallel with the two circuit breakers S1 and S3 and UPS module 12. The circuit breakers S1, S2 and S3 are used when bypassing the UPS module 12 due to service or malfunction. In normal operation of the UPS module, the second circuit breaker S2 is open and the third circuit breaker S3 is closed. The first circuit breaker S1 is either open or closed depending on operation situation.

The UPS module 12 connected in series with the first and third circuit breakers S1 and S3 is shown in more detail in a dashed box in FIG. 1. It can be seen that if the multiphase system is a three-phase system, then the UPS module 12 and circuit breakers are three-phase modules and three-phase circuit breakers. Thereby, the first and third circuit breakers each comprise three circuit breaking elements S1a, S1b, S1c, S3a, S3b, S3c, one for each phase.

Moreover it can be seen that the UPS module 12 comprises an inductive element 14 comprising a number of series-connected magnetically coupled windings, where there are two series-connected magnetically coupled windings in each phase. Therefore a first winding L1a may be seen as being connected in series with a second winding L2a between a first circuit breaking element S1a and a third circuit breaking element S3a in a first phase of the branch, where the first winding L1a is magnetically coupled to the second winding L2a and there is a tap point Ta between the windings. There is also a first winding L1b connected in series with a second winding L2b between a first circuit breaking element S1b and a third circuit breaking element S3b in a second phase of the branch, where the first winding L1b is magnetically coupled to the second winding L2b and there is a tap point Tb between the windings. Moreover there is also a first winding L1c connected in series with a second winding L2c between a first circuit breaking element S1c and a third circuit breaking element S3c in a third phase of the branch, where the first winding L1c is magnetically coupled to the second winding L2c and there is a tap point Tc between the windings. The UPS module 12 may be equipped with a first connection terminal for connection to the first circuit breaker S1 and with a second connection terminal for connection to the third circuit breaker S3, where the first connection terminal is provided at the first windings La, Lb and Lc of the inductive element 14.

It can also be seen that each tap point Ta, Tb, Tc is connected to the primary windings of a second three-phase transformer T2, the secondary windings of which are connected to a number of voltage sources VSa, VSb and VSc. In parallel with each such voltage source VSa, VSb, VSc there are also provided energy storage means in the form of capacitors. Moreover, inductors are connected between the voltage sources VSa, VSb, VSc and the capacitors as well as between the primary windings of the second transformer T2 and the capacitors. These entities on the secondary side of the second transformer T2 are here an auxiliary power supply in the form of a converter 16 with energy storage, typically operating at a lower voltage level than the cable voltage level, for instance operating at 480 V. The converter 16 with energy storage is used to feed power to the load in case the cable is unable. This type of operational mode is an islanded operational mode, while operation when the grid supplies power to the load is a nominal operational mode.

It should be realized that the above described inductive element may also be an auto-transformer in which all windings in all three phases are magnetically coupled with each other. However, the magnetic coupling between the windings of the same phase is stronger than the magnetic coupling between the phases.

As stated above the cable CB1 may not be able to supply the power necessary for the load LD1. It may not be able to supply any or only insufficient power. This may be due to the fact that there is a fault either in the cable CB1, the first transformer T1 or in the power distribution system or power grid. If such a situation occurs it may be necessary to disconnect the branch with the UPS module 12 from the cable CB1, which disconnection is typically made by using the first circuit breaker S1. The first circuit breaker S1 in FIG. 1, which is a vacuum circuit breaker, will thus open if the voltage in the grid or upstream cable collapses or deviates considerably from the nominal value.

If the first circuit breaker S1 is opened, for instance as a consequence of a three-phase line-to-ground fault in the upstream cable CB1, then severe over-voltages at the first connection terminal may occur, which may be due to arc re-ignition occurring in the first circuit breaker. These over-voltages may be as high as 100 kV.

There is therefore a need for protecting at least the first windings La, Lb and Lc of the inductive element 14 against over-voltages.

This is according to an aspect of the invention done through using a protection arrangement in the power supply system 10, which protection arrangement comprises one first group of protective components per phase, where each first group comprises a first protective component having a first end connected to a link between the first circuit breaker and the inductive element and a second end connected to a corresponding tap point. In the first group of protective components at least one protective component is a surge arrester. It is furthermore possible that one such first group comprises a second protective component connected between an end of the first protective component and ground. In this case it is possible that at least a component connected between an end of the first protective component and ground is a surge arrester, which may be a metal oxide (MO) surge arrester.

Figure 2:
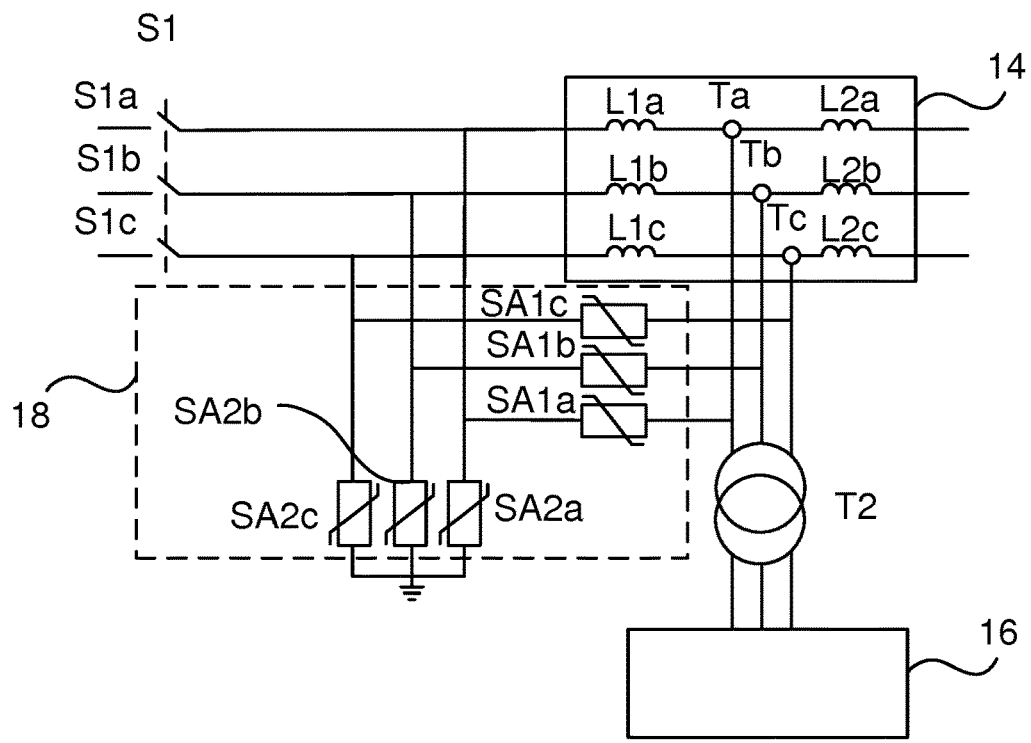

FIG. 2 schematically shows a first embodiment of a protection arrangement 18 for the first windings La, Lb and Lc of the inductive element 14. In the protection arrangement 18, the first group for each phase comprises a first protective component connected between the tap point Ta, Tb, Tc and the link between the first winding L1a, L1b, L1C and the first circuit breaker element S1a, S1b and S1c, where a first end of the first protective component is connected to the link between winding L1a, L1b, L1c and circuit breaker element S1a, S1b, S1c and the second end is connected to the tap point Ta, Tb, Tc. Furthermore, there is, in each first group, a second protective component connected between an end of the first protective component and ground. In this first embodiment the second protective component is connected to the first end of the first protective component. It is thus connected between the first end of the first protective component and ground. It can also be seen that the first protective component is a surge arrester SA1a, SA1b, SA1c and that the second protective component is also a surge arrester SA2a, SA2b, SA2c.

This first embodiment has the advantage of protecting the first windings so that the voltage across them is limited. In this way any over-voltages affecting the first windings can directly be limited by the surge arresters. At the same time the voltage between the first windings and ground is limited by the second protective components. Another advantage is that the voltage between the first connection terminal of the inductive element 14 and the tap point is comparably low when the grid is healthy. Therefore, the leakage current and therefore also the losses in these surge arresters would be very small during nominal operation as well as when operating in islanded mode.

Figure 3:
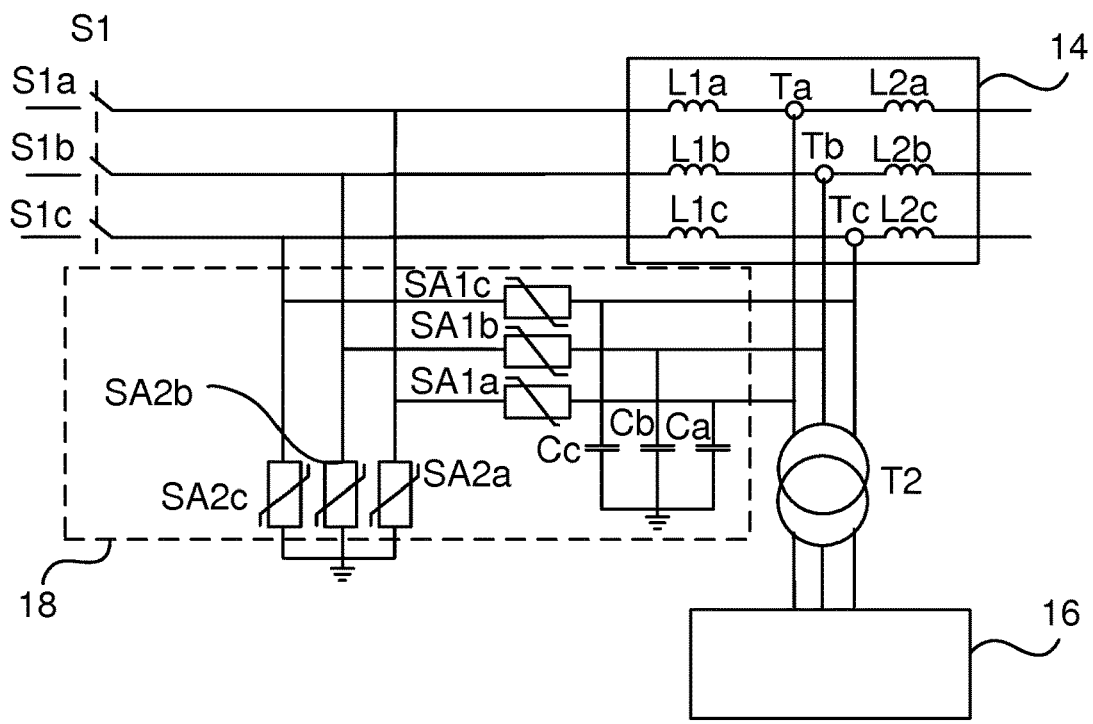

A second embodiment of the protection arrangement 18 is schematically shown in FIG. 3. In this case the second protective component is connected between the second end of the first protective component and ground. In this embodiment the first protective component is again a surge arrester SA1a, SA1b, SA1c, while the second protective component is a capacitor Ca, Cb, Cc, such as a high-frequency capacitor. There is also a third protective component connected between the first end of the first protective component and ground, which third protective component in this case is also a surge arrester SA2a, SA2b, SA2c.

The second embodiment combines the protection against over-voltages across the first winding and between the first winding and ground with a protection of the second transformer T2 against over-voltages. If currents flowing through the surge arresters SA1a, SA1b, SA1c connected to the tap points Ta, Tb and Tc are not returned through the windings L1a, L1b, L1c, this will cause a voltage at the tap points to increase. The high-frequency capacitors Ca, Cb and Cc prevent these high over-voltages.

High-frequency capacitors for transient protection are typically small in size. It is possible to add traditional capacitors connected to ground (or line-to-line) at the tap point between the first and second windings in order to make further improvements. These additional capacitors can be dimensioned to compensate for the reactive power consumption of the first windings while at the same time allowing a larger amount of current to flow through the surge arresters connected to the tap points without causing unnecessarily high over-voltages. There may thus be a further group of protective components comprising further capacitors delta-connected between the tap points Ta, Tb, Tc or connected between the tap points Ta, Tb, Tc and ground.

Figure 4:
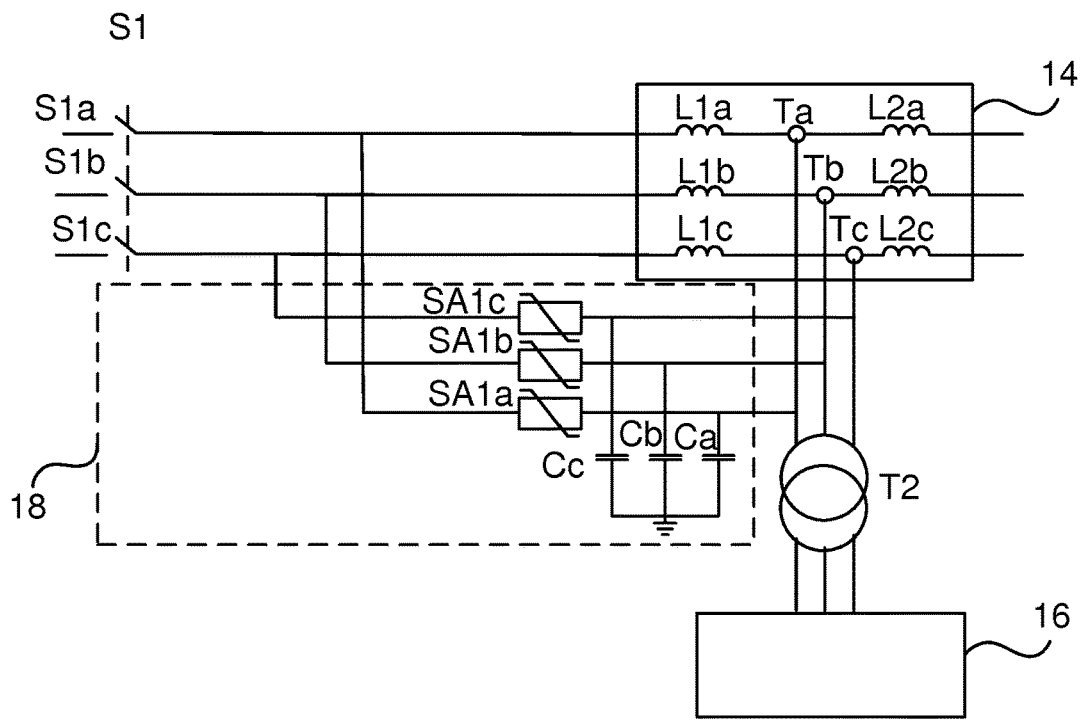

A third embodiment of the protection arrangement 18 is schematically shown in FIG. 4. This embodiment differs from the second embodiment through the fact that there is no third protective component. The surge arresters SA2a, SA2b, SA2c are thus omitted. Thereby the number of protective components is reduced compared with the second embodiment at the expense of protection between the first windings La, Lb, Lc and ground. Also the losses that would occur due to the leakage current in the removed surge arresters are no longer present. It should be noted that the voltage across the remaining surge arresters are low both in nominal and islanded operation, the voltage across these surge arresters is only increasing in the event of a fault. Furthermore, the capacitors connected to the tap points can be dimensioned, by adding extra capacitors, to minimize the reactive power which must be provided by the converter in islanded mode in order to minimize the converter losses.

Figure 5:
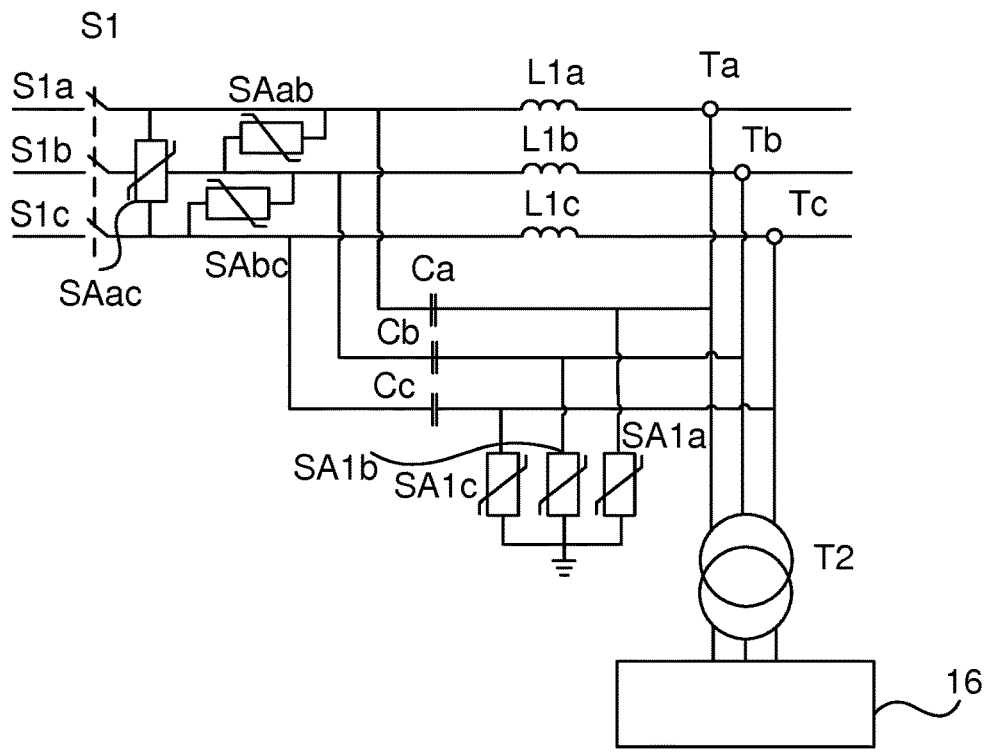

A fourth embodiment of the protection arrangement is schematically shown in FIG. 5. In FIG. 5 only a first half of the inductive element comprising the first windings La, Lb, Lc is shown. This embodiment differs from the third embodiment through the first protective components being capacitors Ca, Cb, Cc and the second protective components being surge arresters SA1a, SA1b, SA1c. There is furthermore a second group of protective components comprising surge arresters SAac, SAab and SAbc delta-connected between the phases at the first end of the first protective component, i.e. at the first connection terminal of the inductive element 14. Put differently, the second group of surge arresters is delta-connected between the phases of the link between the inductive element 14 and the first circuit breaker.

This embodiment has the advantage of providing line-to-line protection at the first connection terminal together with a lower voltage across the capacitors at nominal operation as opposed to being connected to ground. This also gives a lower current through the capacitors.

Figure 6:
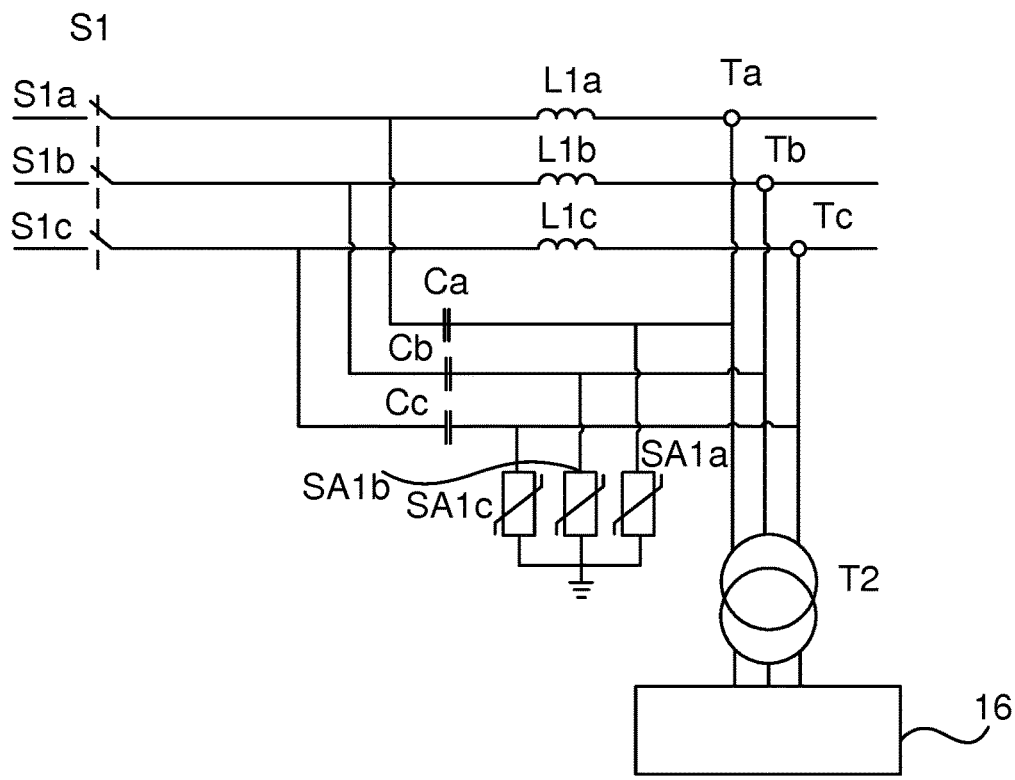

A fifth embodiment of the protection arrangement is schematically shown in FIG. 6. This embodiment differs from the fourth embodiment through the second group of protective components being omitted. Thereby the number of protective components is reduced compared with the fourth embodiment at the expense of line-to-line protection at the first connection terminal of the UPS module 12.

Figure 7:
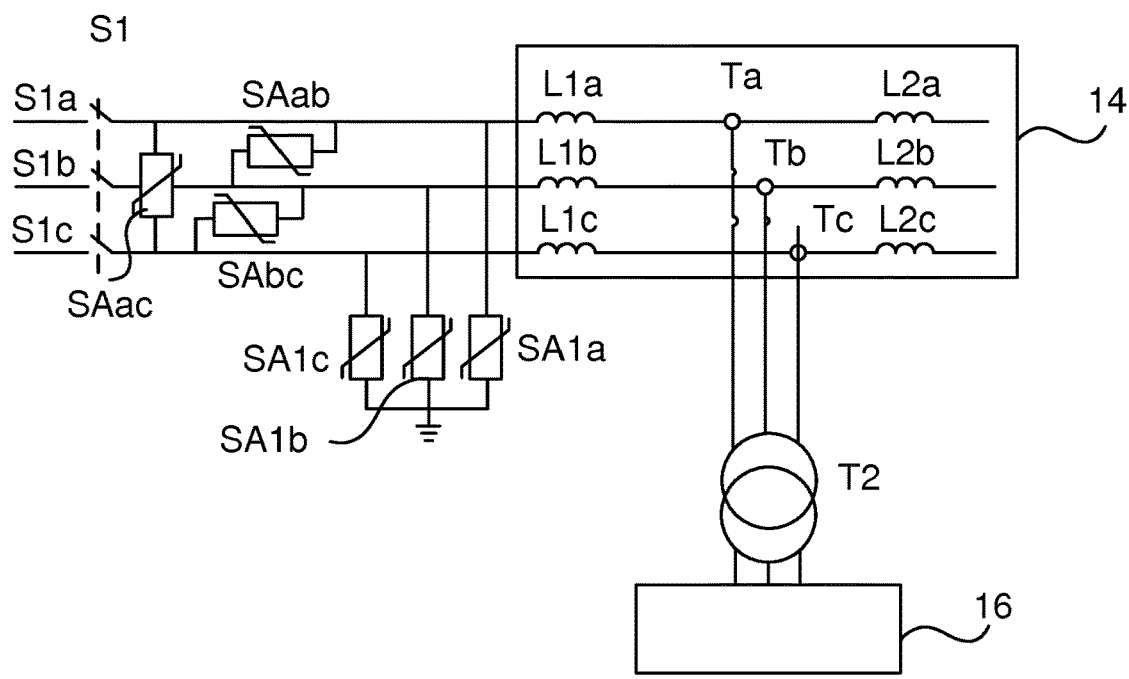

A further variation of the protection arrangement is shown in FIG. 7. This variation is similar to the fourth embodiment shown in FIG. 5 in that it comprises the second group of surge arresters SAab, SAbc and SAac connected between the phases at the link between the inductive element 14 and the first circuit breaker S1. However, the first protective component has been omitted. Instead there is a surge arrester SA1a, SA1b and SA1c connected to ground at the link between the inductive element 14 and the first circuit breaker S1. There are thus three surge arresters connected line-to-ground directly at the first connection terminal of the UPS module 12 in combination with three surge arresters connected line-to-line in a delta configuration. In this way both line-line and line-neutral voltages are limited by the surge arresters.

From the foregoing discussion it is evident that the present invention can be varied in a multitude of ways. It should for instance be realized that the above described inductive element may in all described embodiments be an auto-transformer. It shall consequently be realized that the present invention is only to be limited by the following claims.

The invention claimed is:

1. A protection arrangement for a multiphase uninterruptible power supply system comprising a vacuum circuit breaker connected in series with an inductive element, said inductive element including, for every phase, two series-connected magnetically coupled windings separated by a tap point, the protection arrangement including one first group of protective components per phase, each first group including:

a first protective component having a first end connected to a link between the vacuum circuit breaker and the inductive element, and a second end connected to a corresponding tap point, where at least one protective component in each first group is a surge arrester.

2. The protection arrangement according to claim 1, wherein each first group further includes a second protective component connected between one end of the first protective component and ground.

3. The protection arrangement according to claim 2, wherein the second protective component is connected between the second end of the first protective component and ground.

4. The protection arrangement according to claim 3, wherein the first protective component is a surge arrester and the second protective component is a capacitor.

5. The protection arrangement according to claim 3, wherein the first protective component is a capacitor and the second protective component is a surge arrester.

6. The protection arrangement according to claim 3, further comprising a third protective component connected between the first end of the first protective component and ground.

7. The protection arrangements according to claim 6, wherein the third protective component is a surge arrester.

8. The protection arrangement according to claim 3, comprising a further group of protective components in the form of capacitors being delta connected between the tap points or being connected between the tap points and ground.

9. The protection arrangement according to claim 2, wherein the second protective component is connected between the first end of the first protective component and ground.

10. The protection arrangement according to claim 9, wherein the first and second protective components are surge arresters.

11. The protection arrangement according to claim 1, further comprising a second group of protective components being delta connected between the phases of the link between the vacuum circuit breaker and the inductive element.

12. The protection arrangement according to claim 11, wherein the protective components of the second group are surge arresters.

13. The protection arrangement according to claim 1, wherein the uninterruptible power supply system includes a converter connected to the tap points.

14. The protection arrangement according to claim 13, wherein the uninterruptible power supply system includes a transformer connected between the tap points and the converter.

15. A multiphase uninterruptible power supply system comprising a vacuum circuit breaker connected in series with an inductive element, the inductive element having, for every phase, two series-connected magnetically coupled windings separated by a tap point as well as a protection arrangement including:
  a vacuum circuit breaker connected in series with an inductive element, said inductive element including, for every phase, two series-connected magnetically coupled windings separated by a tap point, the protection arrangement including one first group of protective components per phase, each first group including:
  a first protective component having a first end connected to a link between the vacuum circuit breaker and the inductive element, and a second end connected to a corresponding tap point, where at least one protective component in each first group is a surge arrester.

16. The protection arrangement according to claim 4, further comprising a third protective component connected between the first end of the first protective component and ground.

17. The protection arrangement according to claim 4, comprising a further group of protective components in the form of capacitors being delta connected between the tap points or being connected between the tap points and ground.

18. The protection arrangement according to claim 2, further comprising a second group of protective components being delta connected between the phases of the link between the vacuum circuit breaker and the inductive element.

19. The protection arrangement according to claim 2, wherein the uninterruptible power supply system includes a converter connected to the tap points.

* * * * *